(12) United States Patent
Aghamalian

(10) Patent No.: US 9,687,112 B2
(45) Date of Patent: Jun. 27, 2017

(54) UTENSIL WITH GRIP FEATURE

(71) Applicant: Andre Aghamalian, Burbank, CA (US)

(72) Inventor: Andre Aghamalian, Burbank, CA (US)

( * ) Notice: Subject to any disclaimer, the term of this patent is extended or adjusted under 35 U.S.C. 154(b) by 0 days.

(21) Appl. No.: 15/138,059

(22) Filed: Apr. 25, 2016

(65) Prior Publication Data

US 2016/0235253 A1    Aug. 18, 2016

Related U.S. Application Data

(62) Division of application No. 14/449,139, filed on Jul. 31, 2014, now Pat. No. 9,320,392.

(60) Provisional application No. 61/860,656, filed on Jul. 31, 2013.

(51) Int. Cl.
| | | |
|---|---|---|
| *A47J 43/28* | (2006.01) | |
| *A47G 21/02* | (2006.01) | |
| *A47G 21/10* | (2006.01) | |

(52) U.S. Cl.
CPC ............ *A47J 43/283* (2013.01); *A47G 21/10* (2013.01); *A47J 43/288* (2013.01)

(58) Field of Classification Search
CPC ............................... A47J 43/383; A47G 21/10
USPC ............ 294/3, 7, 99.1, 8, 9, 24, 32; D7/692; 30/122, 123, 150, 340
See application file for complete search history.

(56) References Cited

U.S. PATENT DOCUMENTS

| | | | | |
|---|---|---|---|---|
| D107,410 S | * | 12/1937 | Eliopoulos ...................... 30/142 |
| 2,485,521 A | * | 10/1949 | Wendt ................... A47J 43/288 294/7 |
| 3,348,272 A | * | 10/1967 | Germani ................. D06F 55/00 24/563 |
| 3,492,039 A | * | 1/1970 | Chmela ................. A47J 43/283 294/7 |
| 3,600,762 A | * | 8/1971 | Rissberger ........... G11B 15/674 206/53 |
| 4,346,927 A | * | 8/1982 | Karg ..................... A47J 43/288 294/7 |
| 4,691,440 A | * | 9/1987 | Ushigome ............... A47G 19/28 30/137 |
| D346,722 S | * | 5/1994 | Burdick ......................... D7/642 |
| D355,565 S | * | 2/1995 | Burdick ....................... D7/401.2 |
| D358,741 S | * | 5/1995 | Burdick ......................... D7/642 |
| 5,845,403 A | * | 12/1998 | Nivin ..................... A47G 21/06 30/147 |
| D591,104 S | * | 4/2009 | Oakes ......................... D7/401.2 |

(Continued)

*Primary Examiner* — Paul T Chin

(74) *Attorney, Agent, or Firm* — Law Offices of Kamran Fattahi

(57) ABSTRACT

A utensil for other use in the kitchen or similar venues configured with two side portions and a flexible middle portion formed to bend away from the adjacent side portions. The utensil includes a handle and at least one finger tab extending above and below the middle portion that allow the user to push the middle portion above or below the adjacent side portions and to lock utensil in an open position. The side and middle portions may be configured as a plurality of fork tines or the side and middle portions may be configured as substantially square (rectangular) supports resembling a spatula. Alternatively, the utensil is configured as two separate "L" shaped portions. The combination of the handle, the finger tabs and relatively movable portions allow a user of the utensil to grip food or other items with the utensil.

1 Claim, 7 Drawing Sheets

(56) References Cited

U.S. PATENT DOCUMENTS 7,716,842 B2 * 5/2010 Sumner-Trivisani .. A47G 21/02
16/422

* cited by examiner

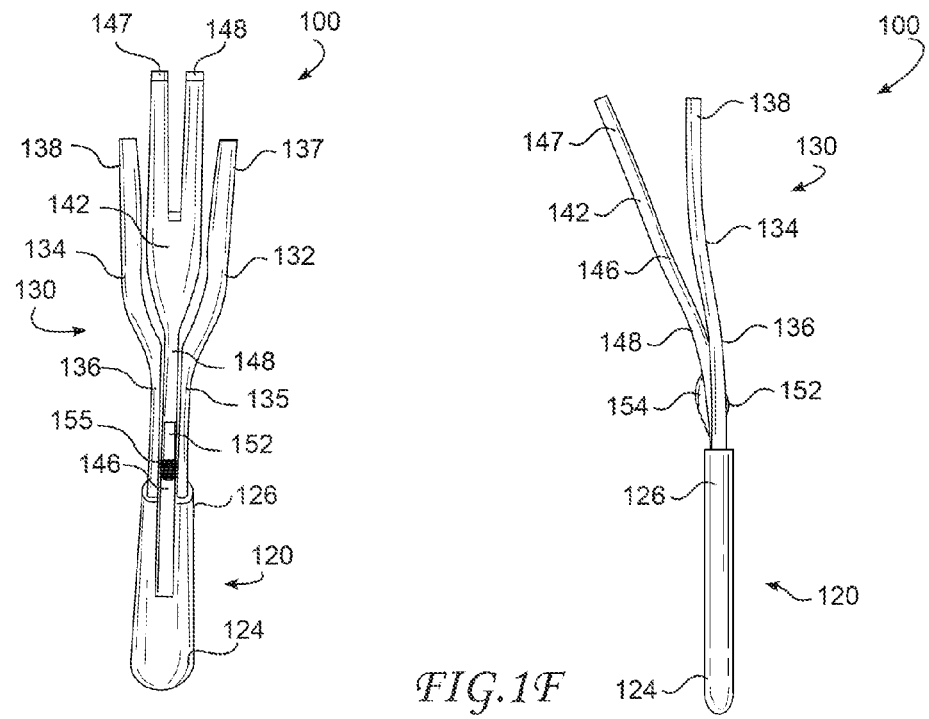
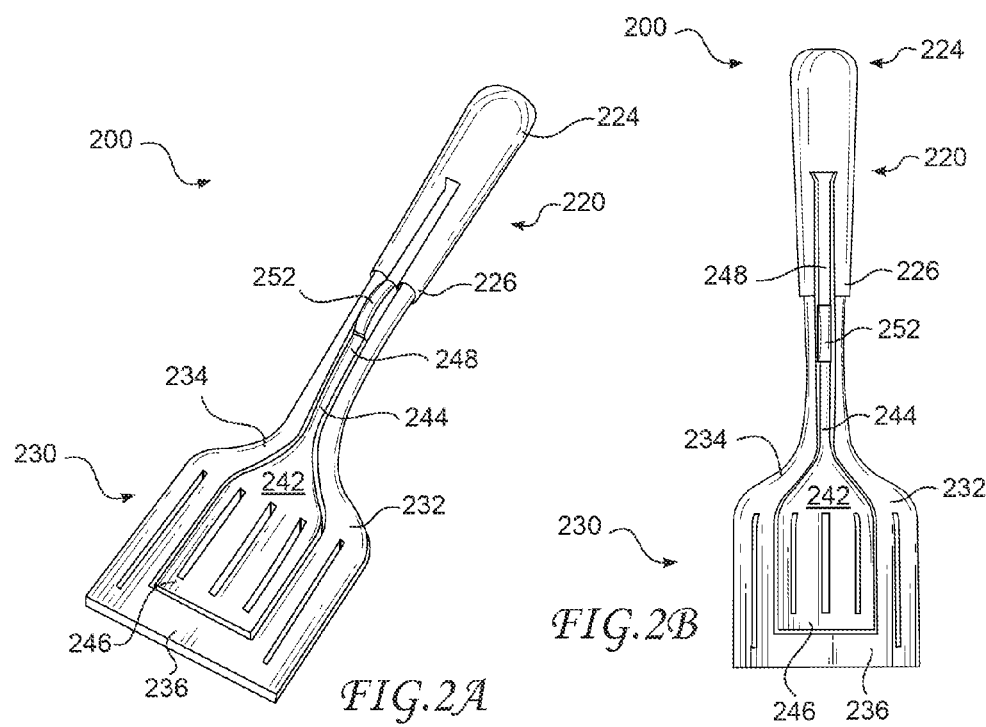

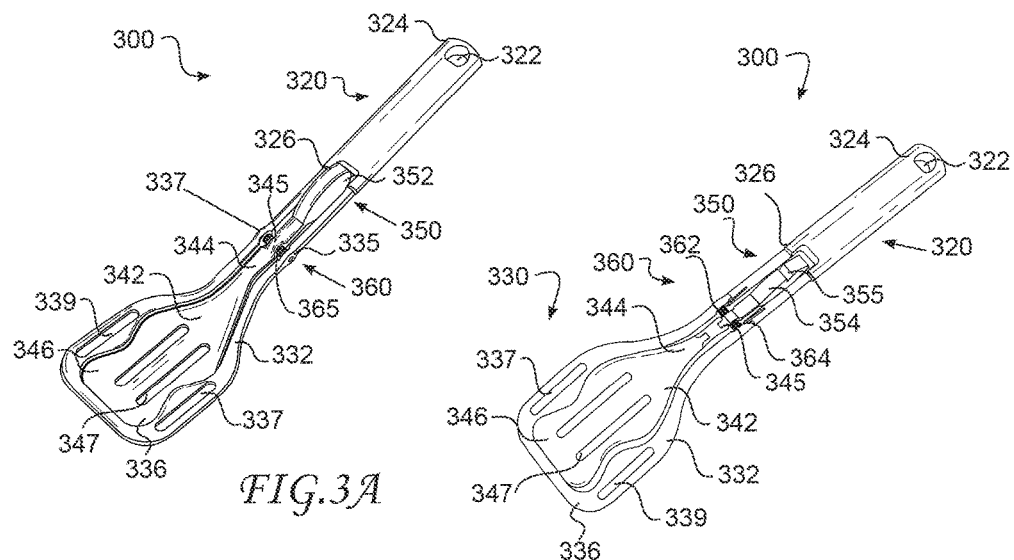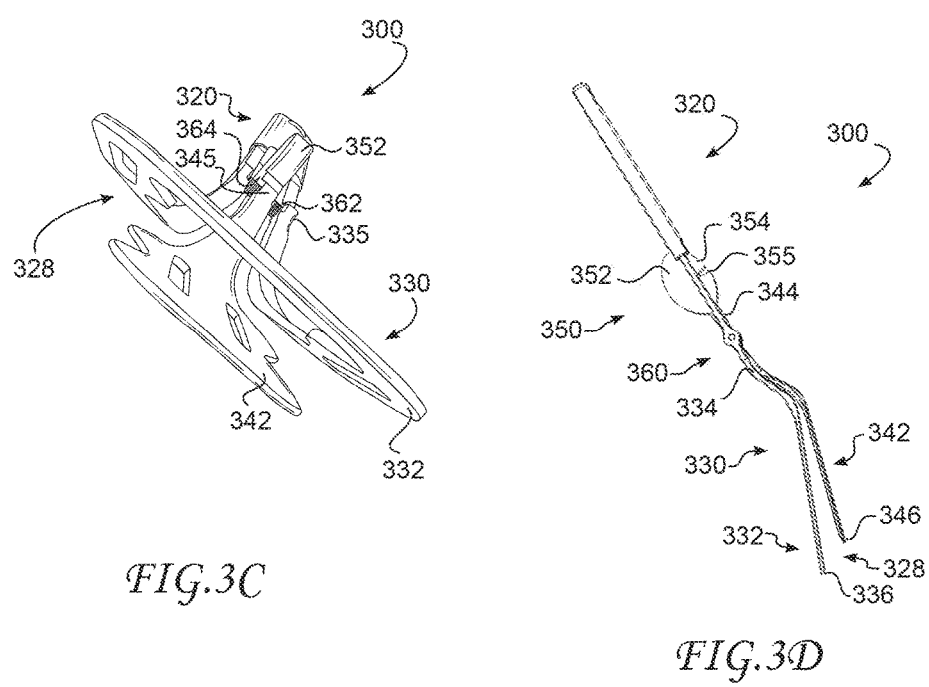

UTENSIL WITH GRIP FEATURE

CROSS-REFERENCE TO RELATED APPLICATION

This application claims the benefit of U.S. Provisional Application Ser. No. 61/860,656 filed Jul. 31, 2013 and U.S. Non-Provisional application Ser. No. 14/449,139 filed Jul. 31, 2014, the contents of which are hereby incorporated herein by reference, and is a divisional application of U.S. Non-Provisional application Ser. No. 14/449,139 filed Jul. 31, 2014.

BACKGROUND OF THE INVENTION

The apparatus of the present invention is directed to a utensil for grasping items, and more particularly for grasping food between movable middle and side portions of the utensil.

Known food utensils vary greatly to manage food for consumption. For example, known utensils are formed from equally shaped and sized sticks with tapered or blunt ends ("chopsticks:). Other known utensils include a fork, a knife and a spoon. Hybrid utensils include a so-called "spork," which combines a fork and a spoon; and a so-called "knork," which combines the tines of a fork and the cutting edge of a knife.

Another known multi-functional cooking utensil is formed from a spatula tool, a tongs tool and fork tool integrated as the one device. One aspect of that multi-functional cooking utensil includes the fork tool combined with a spatula head, having a closed position forming a spatula, and open position forming a pair of tongs.

Such utensils are difficult for the inexperienced user to grasp and hold food and other items.

Accordingly, what has been needed and heretofore unavailable is an improved utensil that overcomes the deficiencies of existing utensil that can be easily be manipulated to grasp food or other items. The present invention disclosed herein satisfies these and other needs.

SUMMARY OF THE INVENTION

The apparatus of the present invention is directed to a utensil for eating food and to other uses in the kitchen or similar venues. In one embodiment, the utensil of the present invention is configured as a fork having two elongated side portions (tines) and having a flexible middle portion formed to bend away from adjacent side portions. The middle portion may be configured with two or more elongated portions (tines). Alternatively, the side and middle portions may be configured as substantially square (rectangular) supports, including elongated cutouts or slits, thereby resembling a spatula. A further embodiment is configured to separate into two "L" shaped portions.

The utensil includes a handle and at least one finger tab that extends above and below the flexible middle portion. The finger tab allows the user of the utensil to push the middle portion above or below (side to side) the adjacent side portions. The finger tab may be slidably disposed on the flexible middle portion so that the finger tab may be moved into the handle to lock the relative positions of the middle and side portions. The combination of the handle, the finger tab and relatively movable middle and side portions allow a user of the utensil to grip food or other items between the middle and side portions.

In one embodiment, the utensil of the present invention is configured in the shape of a fork having a handle and two elongated side portions attached to the handle that form prongs (tines). The fork-shaped utensil includes a flexible middle portion attached to the handle that is positioned between the side portions. A tab (fulcrum) is configured on the middle portion and formed to bend the middle portion away from adjacent side portions. The tab on the middle portion may be configured to move into the two elongated side portions so as to lock the position of the middle portion relative to the position of the side portions. The middle portion may be configured with two or more elongated portions (tines).

In another embodiment, the utensil of the present invention is configured in the shape of a spatula having a handle and a side portion having an upper elongate section attached to the handle and lower rectangular section formed with a central open portion. The spatula-shaped utensil further includes a middle portion having an upper elongate section attached to the handle and a lower rectangular section positioned within the central open portion of the lower rectangular section of the side portion of the spatula. The upper elongate section of the middle portion includes a tab (fulcrum) configured to bend the middle portion away from side portion and lock the two portions apart. The tab may include a slit for resting on the side of a frying pan (skillet) or other cooking utensil. One embodiment of the spatula-shaped utensil includes a spring mechanism configured in the elongate sections so as to bias the middle lower rectangular section within the central open portion of the lower rectangular section of the side portion. The rectangular portions may be configured with horizontal and/or vertical slits for fluid drainage through the spatula.

In a further embodiment, the utensil of the present invention is configured having two overlapping "L"-shaped portions attached to a handle. The first overlapping portion includes an upper elongate section connected to the handle and a tab (fulcrum) configured on the elongate section to bias (move) the "L"-shaped portion relative to the handle. The first overlapping portion is further configured with a lower horizontally extending section to form the "L"-shape with the elongate section. Similarly, the second overlapping portion includes an upper elongate section connected to the handle and a tab configured on the elongate section to bias (move) the "L"-shaped portion relative to the handle and the first "L"-shaped portion. The second overlapping portion is also configured with a second horizontally extending section (forming an "L"-shape) and is positioned adjacent the horizontally extending section of the first "L"-shaped portion. The horizontally extending sections of the two overlapping portions may be configured with at least one elongated slit and a gap may be configured between the two overlapping portions for fluid drainage.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1E is a top plan view of a fork-shaped utensil in accordance with the present invention depicting a middle portion of the utensil having tines longer than tines on the outside of the utensil.

FIG. 1F is a side plan view of the fork-shaped utensil depicted in FIG. 1E showing the middle portion of the utensil deployed away from side portions of the utensil.

FIG. 2A is a perspective view of a utensil of the present invention configured as a spatula.

FIG. 2B is a top plan view of the spatula utensil depicted in FIG. 2A.

FIG. 3A is a top perspective view of a utensil of the present invention configured as a spatula having a pivot mechanism.

FIG. 3B is a bottom perspective view of the pivoting utensil depicted in FIG. 3A.

FIG. 3C is a front perspective view of the pivoting utensil depicted in FIGS. 3A and 3B showing a middle portion of the utensil deployed away from side and end portions of the utensil.

FIG. 3D is a side plan view of the pivoting utensil depicted in FIG. 3C.

DETAILED DESCRIPTION OF THE INVENTION

Figure 1A:
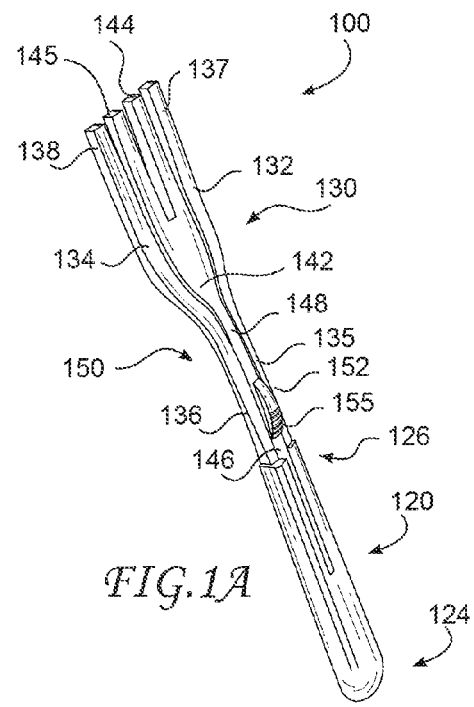
FIG. 1A is a perspective view of a utensil of the present invention configured as a fork.
Figure 1B:
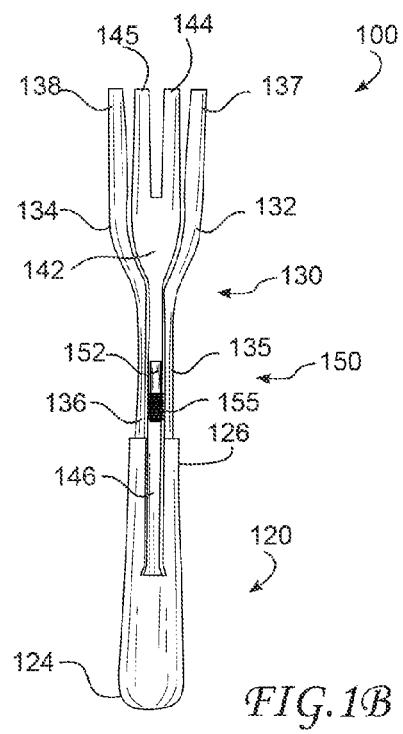
FIG. 1B is a top plan view of the fork-shaped utensil depicted in FIG. 1A.
Figure 1C:
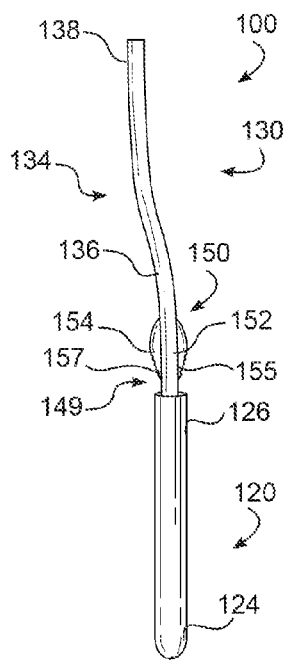
FIG. 1C is a side plan view of the fork-shaped utensil depicted in FIGS. 1A and 1B.

The apparatus of the present invention is generally directed to a utensil having a handle, side portions fixedly attached to the handle, a relatively movable, flexible middle portion fixedly attached to the handle, and a fulcrum tab. The fulcrum tab may be formed on or part of the middle portion extending away from the handle and disposed on either side (above and below, right and left) of the middle portion of the utensil. The fulcrum tab is configured to bend or push the middle portion away from adjacent side portions in an upward or downward (side-to-side) direction. The fulcrum tab may be slidably disposed on the flexible middle portion so that the fulcrum tab may be moved into the handle to lock the relative positions of the middle and side portions. The combination of the handle, the finger tab and relatively movable middle and side portions allow a user of the utensil to grip food or other items between the middle and side portions. The side and middle portions may be configured as a plurality of elongated spikes forming a fork. Alternatively, the side and middle portions may be configured as substantially rectangular supports forming a spatula. In addition, the utensil may be formed with two "L"-shaped gripping portions.

Suitable materials of construction for the utensil of the present invention include natural materials (for example, various woods and bamboo), metals and alloys, plastics, rubbers, polymers, for example, polytetrafluoroethylene— PTFE, and other synthetic materials.

Turning now to the drawings, in which like reference numerals represent like or corresponding aspects of the drawings, and with particular reference to FIGS. 1A to 1D, the utensil 100 of the present invention is configured with a handle 120 having a first (top-upper) end portion 124 and a second (bottom-lower) end portion 126. The utensil includes and a body portion 130 being configured with two elongated side portions 132, 134, each having a first (top-upper) end portion 135, 136 and a second (bottom-lower) end portion 137, 138. The upper end portion of each side portion is attached to the handle at the lower end portion of the handle. The utensil further includes a flexible middle portion 142 having a first (top-upper) end portion 144 and a second (bottom-lower) end portion 146 attached to the second end portion of the handle and positioned between the side portions. As shown in FIGS. 1E and 1F, the tines 147, 148 extending from the middle portion 142 may be longer than the tines 137, 138 extending from the outer portions 132, 134.

Figure 1D:
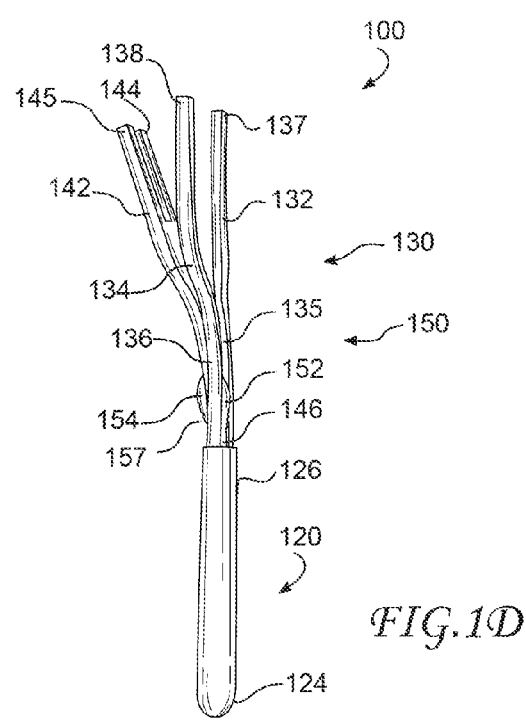
FIG. 1D is a perspective view of the fork-shaped utensil depicted in FIGS. 1A and 1B showing a middle portion of the utensil deployed away from side portions of the utensil.

The utensil of the present invention is further configured with a fulcrum (finger) tab 150 configured on the middle portion 142 proximate the second end portion 126 of the handle 120. A first (top-upper) portion 152 of the fulcrum extends from one side 148 of the middle portion and a second portion 154 of the fulcrum extends from a second side 149 of the middle portion. As shown in FIGS. 1D and 1F, the fulcrum tab is configured to bend or push the middle portion away from the adjacent side portions 122, 124 in an upward or downward (side to side) direction. The fulcrum may be configured on one or both sides with ridges 155, 157 to assist the fulcrum to lock the side and middle portions apart. The fulcrum tab may be configured to slide or otherwise be moved on the flexible middle portion towards or away from second end portion of the handle. Moving the fulcrum tab into the second end portion of the handle locks the relative positions of the middle and side portions of the utensil. The combination of the handle, the finger tab and relatively movable middle and side portions allow a user of the utensil to grip food or other items between the middle and side portions.

Figure 2C:
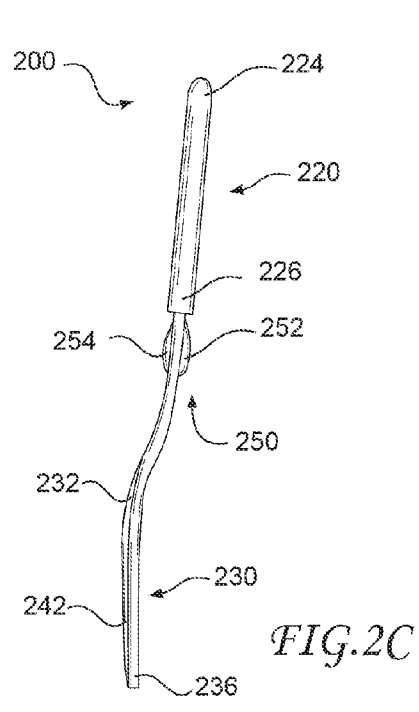
FIG. 2C is a side plan view of the spatula utensil depicted in FIGS. 2A and 2B.
Figure 2D:
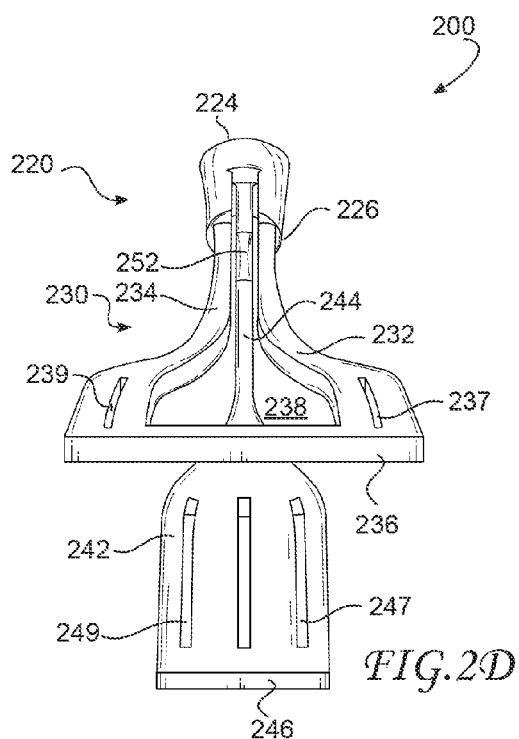
FIG. 2D is a front perspective view of the spatula utensil depicted in FIGS. 2A and 2B showing a middle portion of the utensil deployed away from side and end portions of the utensil.

Referring now to FIGS. 2A to 2F, an alternative embodiment of the utensil 200 of the present invention is configured with a handle 220 having a first (top-upper) end portion 224 and a second (bottom-lower) end portion 226. The bottom-lower portion 230 of the utensil includes two elongate body side sections 232, 234 extending from the bottom end portion of the handle and a distal (bottom) end section 236 joining the two side sections distal (away) from the handle to form a rectangular body; thereby creating a spatula-shaped utensil. The side portions and distal (bottom-lower) end portion form a central opening 238 (FIG. 2D). The utensil further includes a flexible middle portion 242 having a first (top-upper) elongate section 244 and a second (bottom-lower) end rectangular section 246. The upper elongate section of the middle portion is attached to the lower end portion 226 of the handle 220 and is positioned between the elongate body side sections 232, 234. The bottom rectangular section of the middle portion is positioned adjacent the distal end section 236 of the side portion and within the central opening 238 of the body. The side and middle and distal end portions may be configured with a plurality of elongated slits (cutouts) 237, 239, 247, 249, thereby forming a spatula having drainage.

Figure 2E:
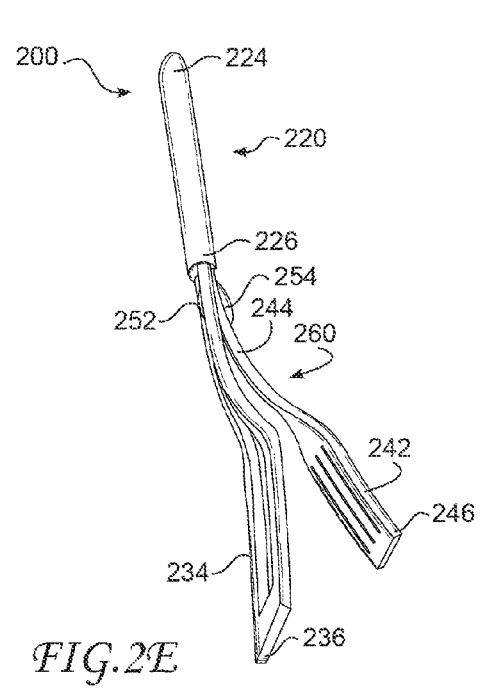
FIG. 2E is a side perspective view of the spatula utensil depicted in FIGS. 2A and 2B showing a middle portion of the utensil deployed away from side and end portions of the utensil.
Figure 2F:
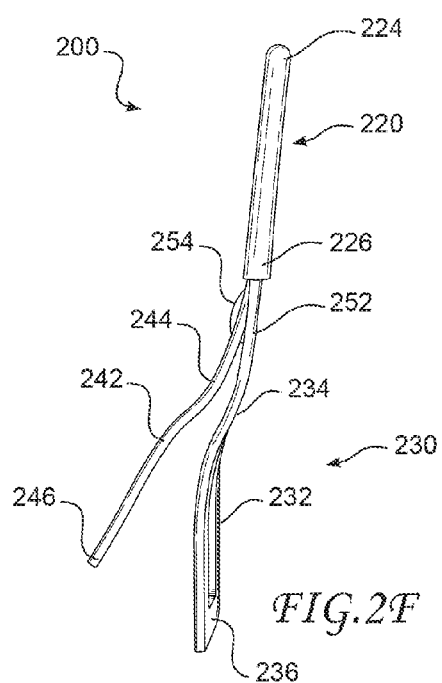
FIG. 2F is a side plan view of a spatula utensil of the spatula utensil depicted in FIGS. 2A and 2B showing a middle portion of the utensil deployed away from side and end portions of the utensil.

The spatula-shaped utensil 200 of the present invention is further configured with a fulcrum (finger) tab 250 configured on the middle portion 242 proximate the lower end portion 226 of the handle 220. A first (top-upper) portion 252 of the fulcrum extends from the top (upper) side of the middle portion and a second portion 254 of the fulcrum extends from the bottom (lower) side of the middle portion. With reference to FIGS. 2D, 2E and 2F, the fulcrum tab is configured to bend or push the middle portion 242 away from (through) the elongate side sections 232, 234 and distal end portion 246 in an upward or downward (side to side) direction. The fulcrum tab may be configured to slide or otherwise be moved on the flexible middle portion towards or away from second end portion of the handle. Moving the fulcrum tab into the elongate sections of the side portion locks the relative positions of the middle and side portions of the utensil. The combination of the handle, the finger tab and relatively movable middle and side portions allow a user of the utensil to grip food or other items between the middle and side and distal end portions.

Referring now to FIGS. 3A to 3D, an alternative embodiment of the utensil 300 of the present invention is configured with a handle 320 having a first (top-upper) end portion 324 and a second (bottom-lower) end portion 326. The bottom-lower portion 330 of the utensil includes a body outside portion 332 extending from the lower end portion of the handle. The outside portion is configured with an elongate section extending distal (away) from the handle, and configured with a rectangular distal end section 336; thereby creating a spatula-shaped utensil. The body side portion and rectangular distal (bottom-lower) end portion form a central opening 328 (FIG. 3C, 3D). The utensil further includes a flexible middle portion 342 having an elongate (top-upper) end portion 344 and a rectangular (bottom-lower) end portion 346. The upper elongate section of the middle portion is attached to the lower end portion 326 of the handle 320 and is positioned between the upper elongate section body and the rectangular distal end section 336 of the outside portion 332, being within the central opening 328 of the body portion. The side and middle portions may be configured with a plurality of elongated slits (cutouts) 337, 339, 347, thereby forming a spatula having drainage.

The spatula-shaped utensil 300 of the present invention is further configured with a fulcrum (finger) tab 350 configured on the middle portion 342 proximate the lower end portion 326 of the handle 320. A first (top-upper) portion 352 of the fulcrum extends from the top (upper) side of the middle portion and a second portion 354 of the fulcrum extends from the bottom (lower) side of the middle portion. The fulcrum may be further configured with a slot 355 to sit on the edge of a frying pan (skillet) or other cooking utensil. With reference to FIGS. 3C and 3D, the fulcrum tab is configured to bend or push the middle portion 342 away from (through) the elongate sections of the outside portion 332 and its rectangular end portion 346 in a downward (side-to-side) direction. The fulcrum tab may be configured to slide or otherwise be moved on the flexible middle portion towards or away from second end portion of the handle. Moving the fulcrum tab into an opening in the upper elongate section of the side portion 332 locks the relative positions of the middle and side portions of the utensil. The combination of the handle, the finger tab and relatively movable middle and side portions allow a user of the utensil to grip food or other items between the middle and side and distal end portions.

The relative movement of the side portion 332 and middle portion 342 of the utensil 300 may be aided by a spring-rod mechanism 360, positioned within slots 335 and 337 formed in the side portion and a slot 345 formed within the middle portion. One or more springs 362, 364 may be positioned on each side of the middle section slot (between the side section slots) to cause the middle section to be retained with the opening in the side portion 328 until moved using the fulcrum. The springs may be configured to return the middle portion within the opening 328 of the side portion when the fulcrum-lock mechanism is released by the user.

Figures 4A, 4B:
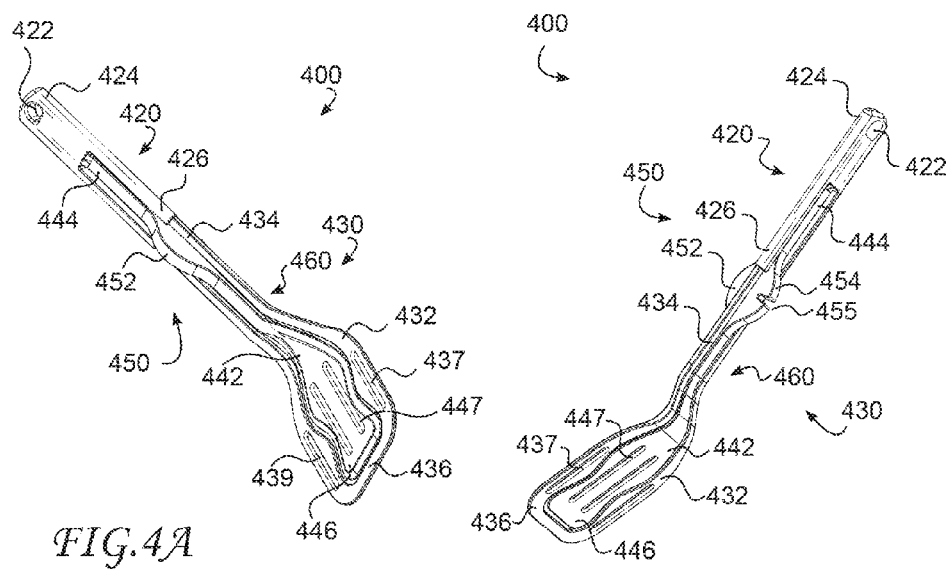
FIG. 4A is a top perspective view of an alternative embodiment of a spatula utensil of the present invention configured from plastic in accordance with the present invention.
FIG. 4B is a bottom perspective view of the plastic spatula utensil depicted in FIG. 4A.

Referring now to FIGS. 4A and 4B, an alternative embodiment of the utensil 400 of the present invention is configured with a handle 420 having a top (upper) end portion 424 and a bottom (lower) end portion 426. The upper end of the handle may be configured with a circular hole (cutout) 422 useful for hanging the utensil from a hook. The bottom (lower) portion 430 of the utensil includes an outside portion 432 extending from the lower end portion of the handle. The outside portion includes an upper elongate section 434 connected to and extending downwards (away) from the handle. The lower section of the outside portion of the utensil is formed with a rectangular bottom (lower) end section 436. The utensil further includes a flexible middle portion 442 having an upper elongate section 444 and a rectangular bottom (lower) end section 446. The upper elongate section of the middle portion is attached to the lower end portion 426 of the handle 420 and is positioned within the elongate section 434 of the outside portion. The elongate section of the outside portion and the elongate section of the middle portion are articulated or curved at the juncture 460 with the lower rectangular sections, thereby creating a spatula-shaped utensil. The lower rectangular outside section and lower rectangular middle section may be configured with one or more elongated slits (horizontal and/or vertical cutouts) 437, 439, 447 so as to provide liquid drainage from the spatula.

The spatula-shaped utensil 400 of the present invention is further configured with a fulcrum (finger) tab 450 configured on the upper elongate section 444 of the middle portion 442 proximate the lower end portion 426 of the handle 420. A first portion 452 of the fulcrum extends from the top (upper)

side of the elongate middle portion of the utensil and a second portion 454 of the fulcrum extends from the bottom (lower) side of the elongate middle portion. Moving the fulcrum tab into the opening in the elongate section 434 of the outside portion 432 locks the middle portion's lower rectangular section 446 away from the lower rectangular section 436 of the outside portion of the utensil. The fulcrum tab bottom section may further be configured with a slot 455 to sit on the edge of a frying pan (skillet) or other cooking utensil.

Figures 5A, 5B:
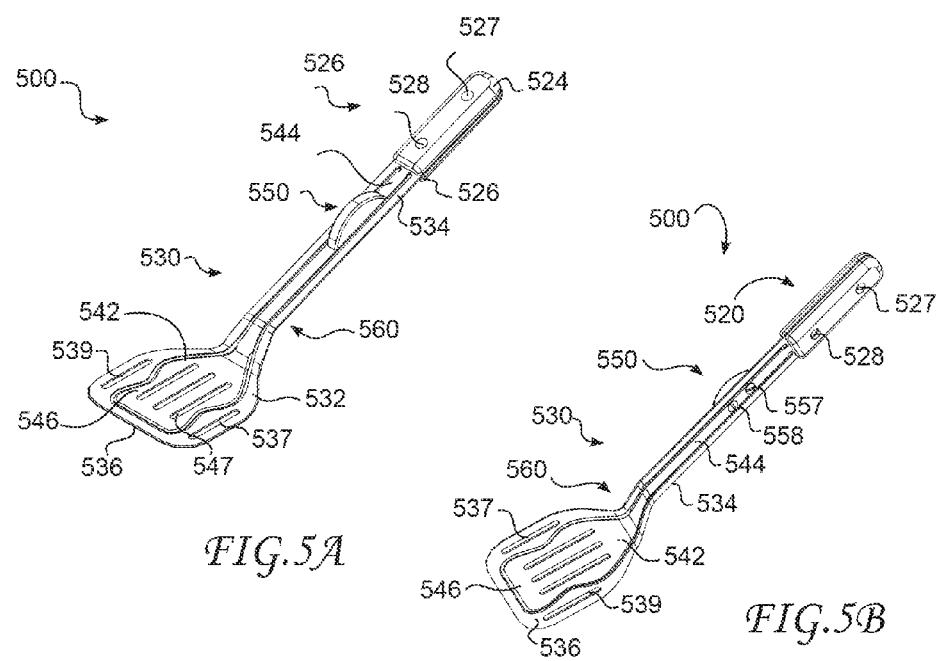
FIG. 5A is a top perspective view of a utensil of the present invention configured as a metal spatula having a wooden handle.
FIG. 5B is a bottom perspective view of the metal spatula utensil depicted in FIG. 5A.

Referring now to FIGS. 5A and 5B, an alternative embodiment of the utensil 500 of the present invention is configured with a handle 520 having a top (upper) end portion 524 and a bottom (lower) end portion 526. The bottom (lower) portion 530 of the utensil is attached to the handle by one or more screws or bolts 527, 528. The utensil lower portion in this embodiment is preferably made of metal and the handle is preferably made of wood. The lower portion includes an outside portion 532 extending from the lower end portion of the handle. The outside portion includes an upper elongate section 534 connected to and extending downwards (away) from the handle. The lower section of the outside portion of the utensil is formed with a rectangular bottom (lower) end section 536. The utensil further includes a flexible middle portion 542 having an upper elongate section 544 and a rectangular bottom (lower) end section 546. The upper elongate section of the middle portion is formed within (cut from) the elongate outside section 534 of the outside portion. The elongate section of the outside portion and the elongate section of the middle portion are articulated or curved at the juncture 560 with the lower rectangular sections, thereby creating a spatula-shaped utensil. The lower rectangular outside section and lower rectangular middle section may be configured with one or more elongated slits (horizontal and/or vertical cut-outs) 537, 539, 547 so as to provide liquid drainage from the spatula.

The spatula-shaped utensil 500 of the present invention is further configured with a fulcrum (finger) tab 550 attached onto the upper elongate section 544 of the middle portion 542 proximate the lower end portion 526 of the handle 520. The fulcrum may be attached to the elongate middle section by one or more screws 557, 558. Depressing the fulcrum bends the elongate middle portion and moves the lower middle rectangular section 546 downward and away from (separates) the outside rectangular section 536. The top portion of the fulcrum may be configured to engage the upper elongate section 534 of the outside portion 532 to lock the separated position of the outside portion and the middle portion.

Figure 6A:
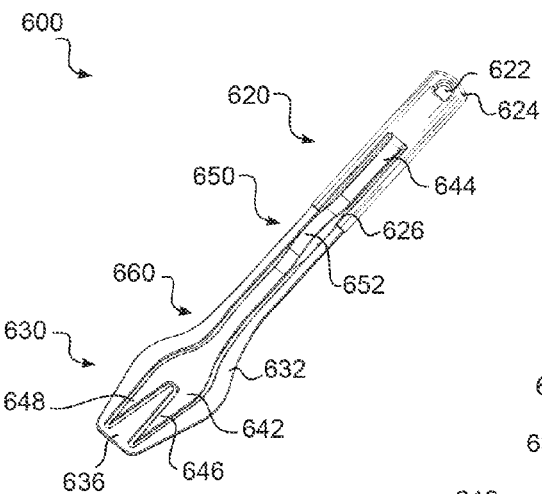
FIG. 6A is a top perspective view of an alternative embodiment of a fork-shaped utensil of the present invention configured in accordance with the present invention.
Figure 6B:
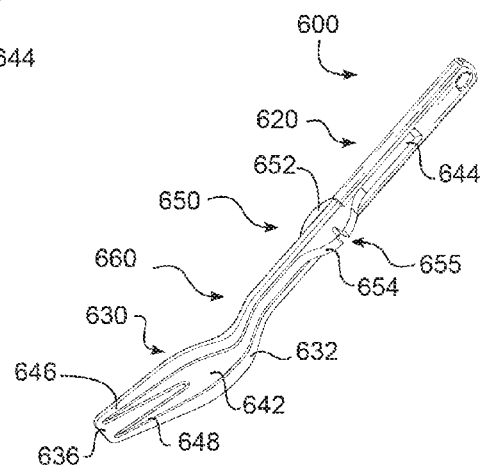
FIG. 6B is a bottom perspective view of the fork-shaped spatula utensil depicted in FIG. 6A.

Referring now to FIGS. 6A and 4B, an alternative embodiment of the utensil 600 of the present invention is configured with a handle 620 having a top (upper) end portion 624 and a bottom (lower) end portion 626. The upper end of the handle may be configured with a circular hole (cutout) 622 useful for hanging the utensil from a hook. The bottom (lower) portion 630 of the utensil includes an outside portion 632 extending from the lower end portion of the handle. The outside portion includes an upper elongate section 634 connected to and extending downwards (away) from the handle. The lower section of the outside portion of the utensil is formed with a curved "W" shaped bottom (lower) end section 636. The utensil further includes a flexible middle portion 642 having an upper elongate section 644 and a "U" shaped (two prong-tine) bottom (lower) end section 646, 648. The upper elongate section of the middle portion is attached to the lower end section 626 of the handle 620 and is positioned within the elongate outside section 634 of the outside portion. The elongate section of the outside portion and the elongate section of the middle portion are articulated or curved at the juncture 560 with the lower rectangular sections, thereby creating a spatula-shaped utensil. The lower "U" shaped middle section fits within the curved cutouts of the lower "W" shaped outside section to form a spatula that resembles a fork.

The spatula-shaped utensil 600 of the present invention is further configured with a fulcrum (finger) tab 650 configured on the upper elongate section 644 of the middle portion 642 proximate the lower end portion 626 of the handle 620. A first portion 652 of the fulcrum extends from the top (upper) side of the elongate middle portion of the utensil and a second portion 654 of the fulcrum extends from the bottom (lower) side of the elongate middle portion. Depressing the fulcrum bends the elongate middle portion and moves (separates) the middle portion's lower "U" shaped section (tines) 646, 648 away from the lower "W" shaped section 636 of the outside portion 632 of the utensil. The top portion of the fulcrum may be configured to engage upper elongate sections of the outside portion 632 to lock the separated position of the "W" shaped section and the "U" shaped section. The fulcrum tab bottom section may further be configured with a slot 655 to sit on the edge of a frying pan (skillet) or other cooking utensil.

Referring now to FIGS. 7A to 7D, an alternative embodiment of the utensil 700 of the present invention is configured with a handle 720 having a top (upper) end portion 724 and a bottom (lower) end portion 726. The upper end of the handle may be configured with a circular hole (cutout) 722 useful for hanging the utensil from a hook. The lower end of the handle may be configured with grooves or slots 725, 727 in the front side and in the backside of the handle to sit on the edge of a frying pan (skillet) or other cooking utensil. Alternatively, one or more grooves (slots) may encircle the entire handle to allow the utensil to be hung or placed in any orientation or position.

Figure 7A:
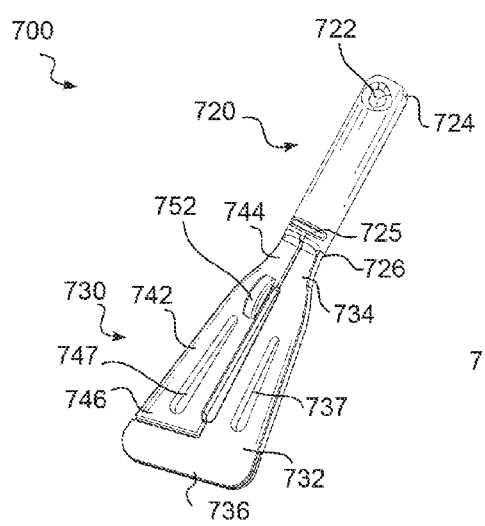
FIG. 7A is a top perspective view of a utensil of the present invention configured with two "L"-shaped gripping portions.
Figure 7B:
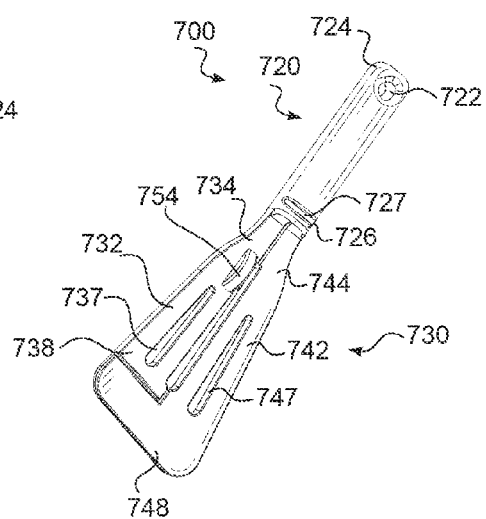
FIG. 7B is a bottom perspective view of the gripping utensil depicted in FIG. 7A.

The bottom (lower) body portion 730 of the utensil 700 includes two overlapping ("L" shaped) portions 732, 742 extending from the lower end portion of the handle. The first upper overlapping portion 732 includes an upper elongate section 734 connected to and extending downwards (away) from the handle. The upper overlapping portion of the utensil is formed with an "L" shaped bottom (lower) end section 736 that is configured with a horizontal extending section 738. A fulcrum (finger) tab 754 is configured on the backside of the upper elongate section 734 proximate the lower end portion 726 of the handle 720 (FIG. 7B). The lower end section may be configured with one or more elongated horizontal slits 737, so as to provide liquid drainage from the utensil. Similarly, the lower end section 746 of the lower overlapping portion 742 may be configured with one or more elongated horizontal slits 747, so as to provide liquid drainage from the utensil. In addition, the juncture (wall) at the upper elongate sections 734, 744 may be configured with a gap to allow fluid drainage through the middle of the utensil.

Figure 7C:
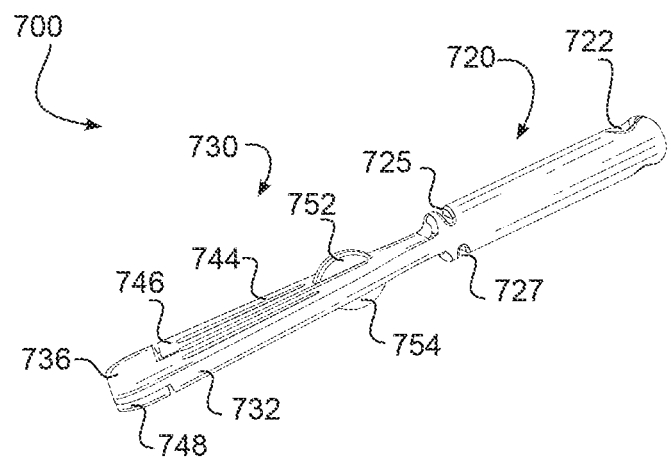
FIG. 7C is a side perspective view of the pivoting utensil depicted in FIGS. 7A and 7B.
Figure 7D:
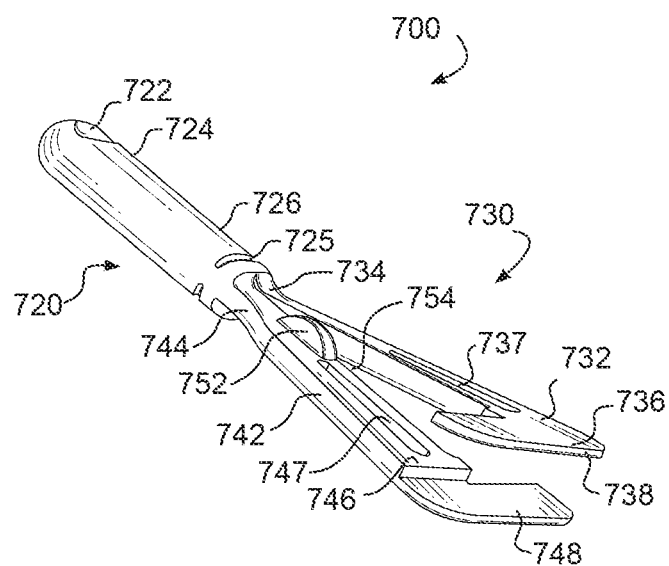
FIG. 7D is a front perspective view of the gripping utensil depicted in FIGS. 7A and 7B showing each "L"-shaped middle portion of the utensil deployed away from the other portion.

The lower overlapping portion 742 of the utensil 700 further includes a second upper elongate section 744 connected to and extending downwards (away) from the handle lower end portion 726. The "L" shaped bottom (lower) end section 746 of the lower overlapping portion is configured with a horizontal extending section 748 that is positioned adjacent the horizontal extending section 738 in the "L" shaped bottom section 736 of the upper overlapping portion 732. A fulcrum (finger) tab 752 is configured on the top side of the upper elongate section of the lower overlapping portion proximate the lower end portion 726 of the handle 720 (FIG. 7C). As shown in FIG. 7D, the fulcrum tabs 752, 754 on the elongate portions of the utensil body 730 are used to separate the upper overlapping portion from the lower overlapping portion so that the horizontal extending sections 738, 748 may be used grip food or other items between the horizontal extending sections of the overlapping portions. The fulcrum tabs may be configured to lock the upper overlapping portion and the lower overlapping portion on an 'open' position such that the horizontal extending sections are separated.

The fork-shaped utensils may be configured in a variety of dimensions, depending upon the purpose. For example, for use a barbeque (grilling) utensil, the handle may have a length in the range of seventeen (17) centimeters to thirty-two (32) centimeters and preferably twenty-five (25) centimeters. The handle may have a width in the range of eighteen (18) millimeters to forty (40) millimeters and preferably thirty-four (34) millimeters. The body portion forming the base of the fork may have a length in the range of ten (10) centimeters to twenty (20) centimeters and preferably fifteen (15) centimeters. The body portion may have a width in the range of fifty (50) millimeters to eighty (80) millimeters and preferably seventy-two (72) millimeters. The tines of the fork may have a length in the range of six (6) centimeters to fourteen (14) centimeters and preferably ten and five tenths (10.5) centimeters. The tines of the fork may have a width in the range of thirty (30) millimeters to forty (40) millimeters and preferably thirty-six and five tenths (36.5) millimeters.

The spatula-shaped utensils may be configured in a variety of dimensions, depending upon the purpose. For example, for use a barbeque (grilling) utensil, the handle may have a length in the range of eighteen (18) centimeters to thirty-three (33) centimeters and preferably twenty-five and three tenths (25.3) centimeters. The handle may have a width in the range of twenty-eight (28) millimeters to forty (40) millimeters and preferably thirty-four (34) millimeters. The outer body portion of the spatula may have a length in the range of eight (8) centimeters to fourteen (14) centimeters and preferably ten and sixteen one-hundredths (10.16) centimeters. The outer body portion of the spatula may have a width in the range of ninety (90) millimeters to one hundred and twenty (120) millimeters and preferably one hundred and one and six tenths (101.6) millimeters. The inner body portion of the spatula may have a length in the range of seven (7) centimeters to fourteen (14) centimeters and preferably nine and five-tenths (9.5) centimeters. The inner body portion of the spatula may have a width in the range of thirty-eight (38) millimeters to fifty (50) millimeters and preferably forty-four (44) millimeters.

The "L"-shaped utensil may be configured in a variety of dimensions, depending upon the purpose. For example, for use a barbeque (grilling) utensil, the handle may have a length in the range of ten (10) centimeters to seventeen (17) centimeters and preferably twelve and five tenths (12.5) centimeters. The handle may have a width in the range of twenty-seven (27) millimeters to thirty-five (35) millimeters and preferably thirty-one and six tenths (31.6) millimeters. Each "L"-shaped portion of the spatula may have a length in the range of twelve (12) centimeters to eighteen (18) centimeters and preferably seventeen and three tenths (17.3) centimeters. Each "L"-shaped portion of the spatula may have a width in the range of ninety (90) millimeters to one hundred and five (105) millimeters and preferably ninety-nine and three tenths (98.3) millimeters.

The above-described embodiments have been provided by way of example, and the present invention is not limited to these examples. Multiple variations and modification to the disclosed embodiments will occur, to the extent not mutually exclusive, to those skilled in the art upon consideration of the foregoing description. While certain aspects of the invention have been illustrated and described herein in terms of its use with specific materials, it will be apparent to those skilled in the art that the utensil can be made from many materials not specifically discussed herein. Further, particular sizes and dimensions of the utensil have been described herein and are provided as examples only. Additionally, other combinations, omissions, substitutions and modifications will be apparent to the skilled artisan in view of the disclosure herein. Accordingly, the present invention is not intended to be limited by the disclosed embodiments, but is to be defined by reference to the appended claims.

I claim:

1. An apparatus, comprising;
a handle,
a first overlapping portion connected to the handle having a first elongate section and a first tab configured on the first elongate section, wherein the first overlapping portion is further configured with a first horizontally extending section; and
a second overlapping portion connected to the handle having a second elongate section and a second tab configured on the second elongate section, wherein the second overlapping portion is further configured with a second horizontally extending section positioned adjacent to and physically separated from the first horizontally extending section, and wherein the first tab and the second tab are configured to allow force to be applied thereon for movement of the position of the second overlapping portion relative to the position of the first overlapping portion such that the first horizontally extending section can move between an open position separated from the second horizontally extending section and a closed position coming into contact with the second horizontally extending section.

* * * * *